(12) United States Patent
Rytkönen (10) Patent No.: US 9,366,690 B2
(45) Date of Patent: Jun. 14, 2016

(54) VIBRATION TOLERANT ACCELERATION SENSOR STRUCTURE

(71) Applicant: MURATA ELECTRONICS OY, Vantaa (FI)

(72) Inventor: Ville Pekka Rytkönen, Klaukkala (FI)

(73) Assignee: MURATA ELECTRONICS OY, Vantaa (FI)

(*) Notice: Subject to any disclaimer, the term of this patent is extended or adjusted under 35 U.S.C. 154(b) by 494 days.

(21) Appl. No.: 13/739,220

(22) Filed: Jan. 11, 2013

(65) Prior Publication Data

US 2013/0192362 A1    Aug. 1, 2013

(30) Foreign Application Priority Data

Jan. 12, 2012  (FI) ..................... 20125035

(51) Int. Cl.
*G01P 15/08* (2006.01)
*G01P 15/125* (2006.01)

(52) U.S. Cl.
CPC ............ *G01P 15/08* (2013.01); *G01P 15/125* (2013.01); *G01P 2015/0831* (2013.01)

(58) Field of Classification Search
USPC .............. 73/514.36, 514.37, 514.38, 504.08, 73/504.12, 504.18, 504.04
See application file for complete search history.

(56) References Cited

U.S. PATENT DOCUMENTS

| 6,843,127 | B1* | 1/2005 | Chiou | ........................ | 73/504.12 |
| 2004/0154397 | A1* | 8/2004 | Platt | .................. | G01C 19/5719 73/504.12 |
| 2006/0185433 | A1 | 8/2006 | Leonardson et al. | | |
| 2006/0272411 | A1 | 12/2006 | Acar et al. | | |
| 2007/0222011 | A1* | 9/2007 | Robert et al. | .................. | 257/415 |
| 2009/0223277 | A1 | 9/2009 | Rudolf et al. | | |
| 2009/0256297 | A1* | 10/2009 | Geisberger | .................... | 267/160 |
| 2009/0260437 | A1 | 10/2009 | Blomqvist | | |
| 2010/0107763 | A1 | 5/2010 | Lin et al. | | |
| 2010/0147073 | A1 | 6/2010 | Johnson et al. | | |

(Continued)

FOREIGN PATENT DOCUMENTS

CN    102203001 A    9/2011
EP    2 175 280 A1    4/2010

(Continued)

OTHER PUBLICATIONS

International Search Report international application No. PCT/FI2013/050024 dated May 6, 2013.

(Continued)

*Primary Examiner* — Hezron E Williams
*Assistant Examiner* — Tarun Sinha
(74) *Attorney, Agent, or Firm* — SQUIRE PATTON BOGGS (US) LLP (57) ABSTRACT

A MEMS structure comprises an anchor, a spring, and a seismic mass that is suspended to the anchor via the spring to pivot around an axis of rotation. Errors from unwanted vibration modes are reduced by including in the MEMS structure a spring structure that extends from the seismic mass to the anchor. Said spring structure comprises a side arm that is connected to the seismic mass or the anchor. At least part of the spring structure is formed by a side arm that extends in the spring structure in a direction parallel to the axis of rotation of the seismic mass; and is attached to one end of the spring.

15 Claims, 5 Drawing Sheets

(56) References Cited

U.S. PATENT DOCUMENTS

| | | |
|---|---|---|
| 2010/0218605 A1 | 9/2010 | Blomqvist et al. |
| 2010/0236327 A1* | 9/2010 | Mao .......................... 73/504.12 |
| 2011/0030472 A1 | 2/2011 | Aziz et al. |
| 2011/0056294 A1 | 3/2011 | Simoni et al. |
| 2011/0219875 A1 | 9/2011 | Walther et al. |
| 2011/0265566 A1* | 11/2011 | Acar et al. ................. 73/504.12 |
| 2012/0125104 A1* | 5/2012 | Qiu et al. ................... 73/514.32 |

FOREIGN PATENT DOCUMENTS

| | | |
|---|---|---|
| EP | 2 199 741 A2 | 6/2010 |
| EP | 2278341 A1 | 1/2011 |

OTHER PUBLICATIONS

International Search Report international application No. PCT/FI2013/050025 dated May 14, 2013.

Finnish Search Report dated Sep. 11, 2012 corresponding to Finnish Patent Application No. 20125035.

European Patent Office, European Search Report for corresponding European Patent Application No. 13736230.7, dated Jul. 3, 2015.

Chinese Patent Office, Search Report for corresponding CN Patent Appln. No. 2013800141215, Oct. 19, 2015.

* cited by examiner

VIBRATION TOLERANT ACCELERATION SENSOR STRUCTURE

The invention in general relates to MEMS (Micro-Electro-Mechanical-Systems) technologies, but more specifically to an improved MEMS structure as defined in the preamble of the independent claim. The invention relates also to an accelerator sensor, an acceleration sensor matrix, a device and a system including the improved MEMS structure.

Sensing acceleration of a body to provide a signal that depends on the kinetic state of said body under the influence of the acting forces is a widely applied way to detect movement and orientations of the body. For the purpose, various sensors can be used, but MEMS structures are suitable for many applications because of their small size. In microelectronics, the increasing demand has made it possible to develop better and better structures for purposes encountered in many fields, for example such that relate to vehicles, domestic electronics, clothes, shoes, to mention a few applied fields in which patent classes may comprise MEMS related acceleration sensors.

Applications that use MEMS structures to measure acceleration or the related forces also need to appropriately control error signals. These error signals may be caused by sudden transient forces, but also by periodic forces that are superposed from various components, among which there may be transients. Thus, in difficult conditions the desired signal may drown into noise, or vibrations in the structure may become very strong. The operation of the MEMS component may thus be disturbed, or reasonable interpretation of the signals by means of signal processing may become, if not completely impossible, very slow and tedious.

One type of MEMS structures comprise a planar sensing element that is supported by a rotational spring and is thereby arranged to pivot around an axis of rotation. The mechanical element supports electrodes, which move along the pivoting in a see-saw or "teeter-totter" kind of movement along the pivoting of the mechanical element. Static sensing electrodes are arranged to interact with the moving electrodes, and output signals are generated from the changing capacitances between the moving electrodes and the static electrodes.

Figure 1:
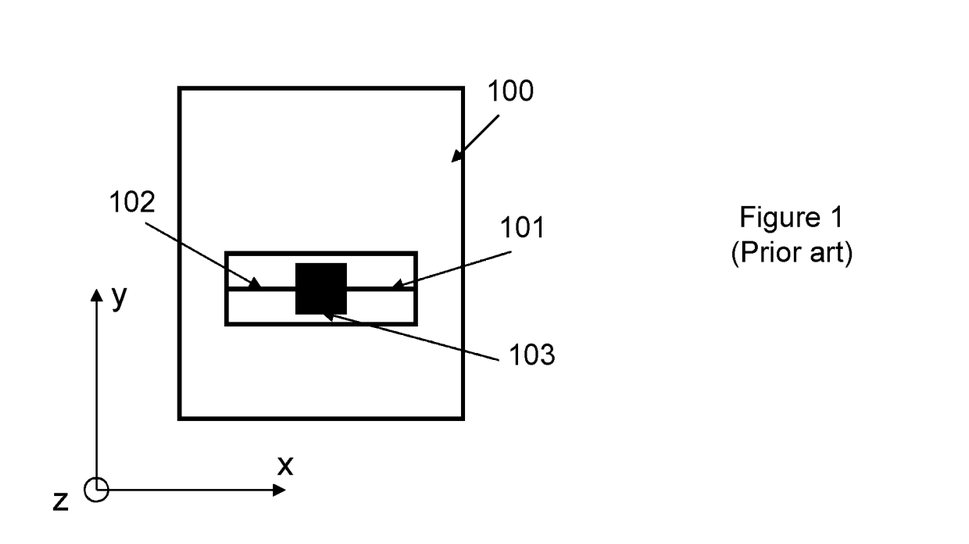
FIG. 1 illustrates schematically a pivoting mechanical element according to known techniques.

FIG. 1 illustrates schematically a pivoting mechanical element according to known techniques. The planar mechanical element comprises a seismic mass 100, and springs 101, 102 that support the seismic mass to an anchor 103 that may be fixed to a body, the movements of which are to be detected. In the exemplary prior art configuration of FIG. 1, the springs 101, 102 are anchored so that the seismic mass 100 surrounds the suspending springs illustrated as black straight lines.

The structure of FIG. 1 is a standard well-working structure as such. However, the structures are newer ideal; the seismic mass surrounds the anchor that is in the middle or essentially in the middle of the surrounding seismic mass, and the seismic mass is connected to the anchor by the springs that may or may not have exactly the specific alignment shown in FIG. 1. The seismic mass may thus vibrate in other directions than the desired ones.

The desired movement direction may be around the X-axis locally indicated in FIG. 1, which means that movements in Y and Z-directions, according to the respective indications, are typically not wanted. However, such may be present to some extent. Any resulting instability may be annoying for the operation in applications that use MEMS acceleration sensors for measuring force, movement or the change in either of these.

Thus, the structure can vibrate mechanically in several directions, and transients as well as relatively small vibrations may unwantedly be connected to the seismic mass to cause errors. The movement may also interfere with the desired signal so that it is harder to distinguish the signal from error, i.e. the mode of the vibration is not clean. Thus, the structure as such may suffer from multi-modality of the vibrations, which may be an unwanted property for certain applications, although it may be wanted in some others.

The object of the present invention is to provide a solution so as to overcome, or to alleviate at least one of the prior art disadvantages. The objects of the present invention are achieved with MEMS structure according to the characterizing portion of claim 1. The objects of the present invention are further achieved with an accelerator sensor, an acceleration sensor matrix, a device and a system according to the characterizing portions of the other independent claims. The preferred embodiments of the invention are disclosed in the dependent claims.

In the following, embodiments will be described in greater detail with reference to accompanying drawings. Same reference numerals may be used in similar parts or objects, but are not necessarily mutually identical as a skilled man in the art understands from the context.

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

Features of the invention will be described with simple examples of sensor structures in which various embodiments of the invention may be implemented. Only elements relevant for illustrating the embodiments are described in detail. Various implementations of the invented methods and devices comprise elements that are generally known to a person skilled in the art and may not be specifically described herein.

In a configuration of a seismic mass, supported by rotational springs, the associated resonance frequency $f_{res}$ and moment of inertia J depend on the distance of the seismic mass from the axis of rotation. The dependency may be estimated with $$f_{res} = \sqrt{\frac{K_{res}}{J}} \quad (1)$$

and

-continued $$J = \frac{1}{12}m(w^2 + l^2) + mr^2 \quad (2)$$

where $K_{res}$ corresponds to the spring constant of a parasitic rotation mode, J the moment of inertia, w the width of the rotating seismic mass, l the length of the seismic mass and r the distance of the axis of rotation from a parallel axis passing through the center of the seismic mass.

The spring constant $K_{res}$ of the parasitic mode can be estimated with y-direction spring constant $k_y$ of a rotated meander spring;

$$K_{res} = k_y d^2, \quad (3)$$

where d is the distance from the end of the spring to the axis of rotation of the parasitic mode. In case of a rotated meander spring, $k_y$ may be estimated as:

$$k_y = \frac{Ehw^3}{(2N+3)l^3}, \quad (4)$$

where E is the elastic modulus, h is thickness, w is width and l is length of the spring. N is the number of meanders in the spring.

The spring constant of the measurement mode can be estimated with $$\kappa = \frac{Ghw^3}{3(2N+3)l}. \quad (5)$$

where G is the shear modulus of the spring material. The ratio of the resonance modes of the measurement mode and the parasitic mode may thus be estimated as:

$$\frac{\kappa}{\kappa_{res}} = 3\frac{E}{G}\frac{d^2}{l^2}. \quad (6)$$

When distance d is small (approaches zero), equation (3) must be complemented with a correction term:

$$\kappa = \frac{Ehw^3}{3(2N+3)l}, \quad (7)$$

This means that the total spring constant of the first parasitic resonance may be estimated with:

$$\kappa_{res3} = \frac{Ehw^3}{(2N+3)l^3}d^2 + \frac{Ehw^3}{3(2N+3)l}. \quad (8)$$

It has been noted that in some see-saw type of sensor structure configurations, some parasitic resonance modes are quite low and therefore too close to the measured modes. In ideal structures such modes would not disturb the measurements, but in practice no structure is fully symmetric and the measured signals are easily disturbed by the parasitic resonance modes.

Figure 2:
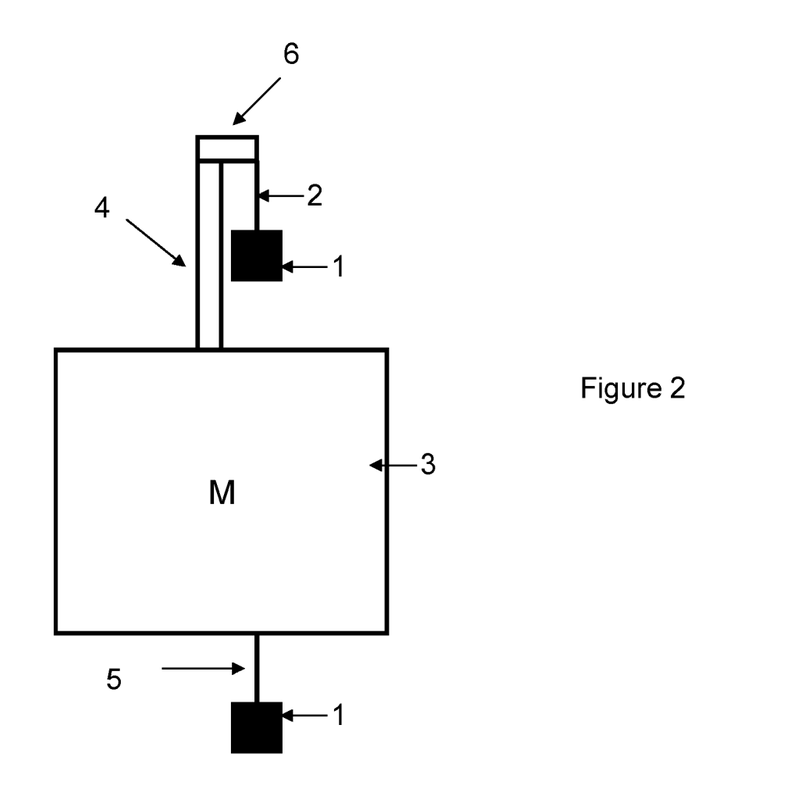
FIG. 2 illustrates an embodiment of a sensor structure configuration.

The block chart of FIG. 2 illustrates a simplified sensor structure configuration with a seismic mass 3 suspended by a spring structure 2, 4, 5, 6 to the anchor 1. The spring structure extends from the seismic mass 3 to the anchor 1, and at least part of the spring structure is formed by a side arm 4 that extends in the spring structure in a direction parallel to the axis of rotation of the seismic mass and is attached to one end of the spring.

It has been noted that the mode of the parasitic resonances can be significantly increased, and thus effectively isolated from the measured modes by increasing the parameter d of equation (8). In view of the configuration of FIG. 2, this means that the distance between the end of at least one of the springs 2 and the axis of rotation of the parasitic mode is increased with the help of a side arm 4 and a shoulder means 6. Said side arm 4 and the shoulder means 6 are attached to the spring 2 and the seismic mass 3, so that the shoulder means 6 with the side arm 4 so designed makes the structure stiffer against unwanted modes of vibrations. Although just one combination of side arm 4 and shoulder means 6 is shown in FIG. 2, a skilled man in the art understands that at least two sets of side arms and/or shoulder means can be used for making the structure even stiffer against unwanted vibrations. In one embodiment this may be achieved with a first set of dimensions of said side arm 4 and/or shoulder means 6 and in another embodiment variant with a second set of dimensions of said side arm 4 and/or shoulder means 6. According to one embodiment, said first and second set of dimensions may be parameterized in a similar manner, and in another embodiment said first and second set of dimensions may be parameterized differently, to kill different modes of unwanted vibrations. According to an embodiment of the invention, the second set of shoulder means 6 and side arm 4 may be attached to the seismic mass symmetrically in respect of the first pair, and in another embodiment non-symmetrically. The shoulder means 6 may be directed away from the side arm, for example to an opposite direction, as shown with the shoulder means 6 in FIG. 2.

Although a L-shaped side-arm 4 and shoulder means 6 combination is indicated and shown, a skilled man in the art understands from the embodiment, that other shapes are also utilizable, for example a T-shape.

According to an embodiment of the invention, the shoulder means 6 and the side arm 4 may be integrated into one structure, making the shape of L to resemble the shape of J. According to an embodiment, also the spring 2 may be integrated into the spring structure, as a thinner part of the integrated structure. These kinds of variations can be made also in a symmetric way to the seismic mass 3. According to an embodiment of the invention the symmetrically attached sets 4,6 can be differently dimensioned for their mechanical length, width and thickness (not denoted in the figure) to yield a spring constant that characterizes the stiffening of the spring structure 2,4,6, to clean the measured vibration from unwanted vibration modes.

In the embodied structure of FIG. 2, the side arm 4 extends into a lever arm that transfers the parasitic rotational movement axis further away from the end of the spring. The momentum thus increases and the spring structure more effectively resists vibrations in unwanted directions. The longer the side arm, the more effectively the first parasitic mode can be increased and thereby separated from the signal generating vibration mode. It is clear that the springs must be aligned with the axis of rotation of the seismic mass, so the role of the shoulder means is to connect the side arm to the end of the spring, when the anchoring does not allow the side arm to be aligned with the spring. Preferably, in order to save space, the shoulder means are dimensioned to extend only to a distance that allows movement of the side arm without touching the anchor 1.

Figure 3A:
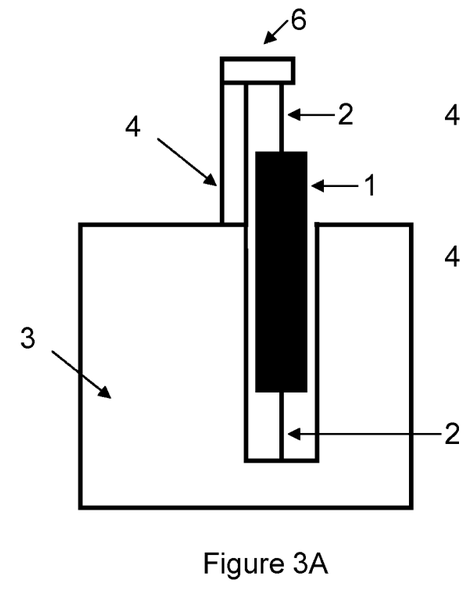
FIGS. 3A and 3B illustrate sensor structure embodiments where the springs are supported to a single anchor.
Figure 3B:
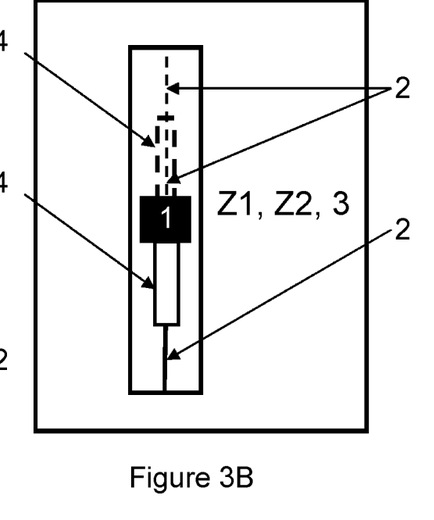

FIGS. 3A and 3B illustrate further embodiments of sensor structures and different anchoring mechanisms with embodiments where the springs are supported to a single anchor 1. In FIG. 3A, the side arm 4 extends between the pivoting seismic mass and the end of the spring, as in FIG. 2, and the shoulder means 6 is used to turn from the side arm 4 to other direction, perpendicular to it, for attaching the spring 2 to the side arm 4, so to form a stiffening spring structure 2, 4, 6. The anchor is an elongated element that extends along the axis of rotation and inside the seismic mass 3.

FIG. 3B illustrates an alternative embodiment, where the anchoring allows the side arm to be aligned with the springs such that the shoulder means 6 is not necessary. The distance between parasitic rotational movement axis and the end of a spring 2 may be increased by fixing one end of the side arm 4 to the anchor 1 and the other end to the spring, as shown in FIG. 3B. Alternatively, one end of the side arm may be fixed to the anchor and the other to the end of the spring 2. In FIG. 3B, the dashed side arm 4 and the dashed spring 2 in the other side of the anchor 1 illustrate that the elements are mutually optional in their respective embodiments. A sensor structure of FIG. 3B may comprise two side arms, symmetrically set in respect to opposite sides of the anchor 1. The side arm configurations in different siders of the anchor may also be mutually different. Also single side 4 arm constructions can be used, wherein on one side of the anchor is side arm and on the other side a spring 2.

Figure 4:
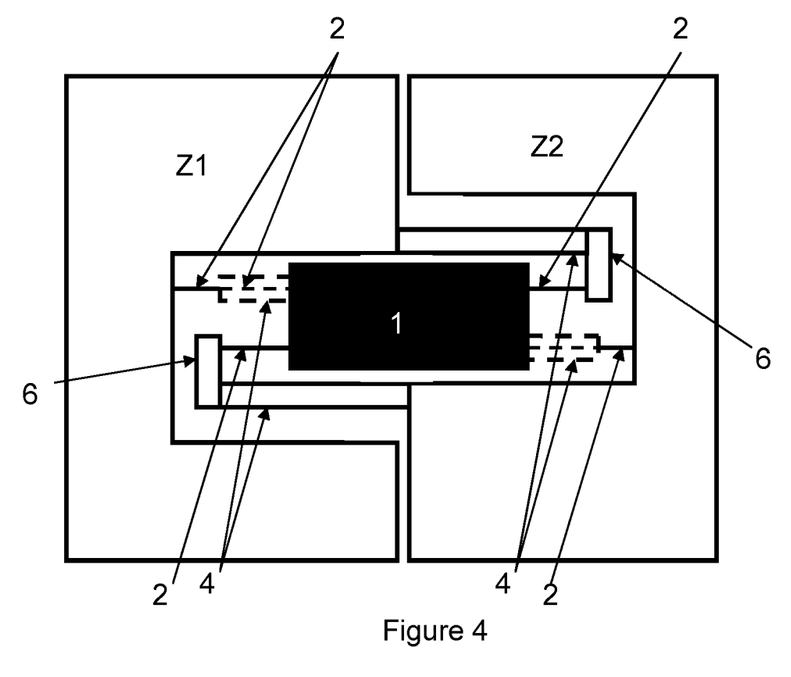
FIG. 4 illustrates an embodiment where capacitive detection of the motion is implemented with two different mass-portions Z1 and Z2.

FIG. 4 illustrates an embodiment where capacitive detection of the motion is implemented with two different seismic masses Z1 and Z2. According to an embodiment of the invention, elements Z1 and Z2 may be implemented as differential structures and be arranged to a specific symmetry to implement a double differential detection structure. The term differential in the context of these embodiments means that, for example, a differential operation comprises a diminishing first quantity at a first location and an increasing second quantity at a second location coupled so that said diminishing and increasing occur because of the same operation. In differential detection both the first quantity and the second quantity are used to generate detection results of the operation.

An example of such a structure is a capacitor pair that has two electrodes, each in a potential, and a common electrode in a ground potential. The electrodes may be arranged so that when the two electrodes pivot around an axis the distance of these electrodes to the common ground electrode changes, one capacitance increases and the other decreases. Such construction is achieved when the mechanical coupling is made with a rigid object that is common to the two pivoting electrodes.

The term double differential in the context of these embodiments means that, for example, there is another differentially coupled pair of quantities, third quantity at a third location and an increasing fourth quantity at a fourth location that behave the same way as explained in the context of differential for the first quantity at a first location and an increasing second quantity at a second location, but with a phase sift in respect to the pair of first quantity and second quantity. In double differential detection the first quantity, the second quantity, the third quantity and the fourth quantity are used in pairs to generate detection results of the operation.

In the structure of FIG. 4, the elements Z1 and Z2 are supported to a single anchor, each with a respective spring structure to provide separate axes of rotation. The first and second quantities of double differential detection refer to capacitances created by electrodes on a moving element Z1, and third and fourth quantities of double differential detection refer to capacitances created by electrodes on a moving element Z2.

In the embodiment of FIG. 4, at least one of the springs of at least one of the seismic masses is connected to the seismic mass via a spring support structure that comprises a side arm 4, and a shoulder means 6. In the other end of the seismic mass, the element illustrated with dashing illustrates that the other spring may be an ordinary spring, or may comprise a further side arm that extends along the spring to further stiffen the spring support structure, as disclosed in FIG. 3B.

Figure 5:
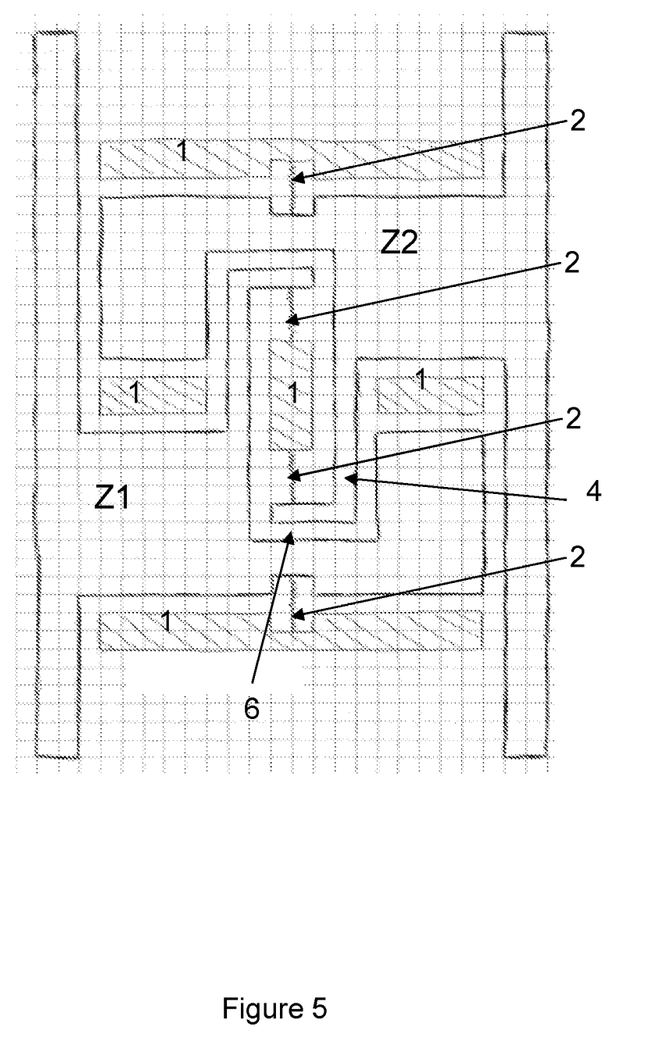
FIG. 5 illustrates an embodiment where elements Z1, Z2 are supported to pivot around a same axis of rotation.

FIG. 5 illustrates a further embodiment, where the elements Z1, Z2 are supported via the spring structure to three anchors (each denoted with 1) and pivot around a same axis of rotation aligned with the springs (each denoted with 2). The elements Z1, Z2 may be applied in combination to implement double differential detection. As shown in FIG. 5, between the seismic mass of each of the elements Z1, Z2 and the end of at least one spring that connects the element to an anchor is a structure that comprises a side arm 4 and a shoulder means 6. In this embodiment the side arm and the shoulder means are integral parts of the pivoting elements Z1, Z2. The side arm 4 extends advantageously in the direction of the spring 2, i.e. parallel to the axis of rotation, and the shoulder means 6 extend to a direction away from the spring 2, preferably perpendicular to the spring 2. The structure of FIG. 5 is stiff in other directions than the measured rotation and effectively eliminates unwanted modes of vibration during detection of the measured rotation. The side arm and the shoulder means of one element Z1 of the double differential detection is nested into the dimensions of the other element Z2 of the double differential detection, and vice versa. The advantage of the extended spring structure is therefore achieved with minimal use of space in the plane of the elements.

Figure 6:
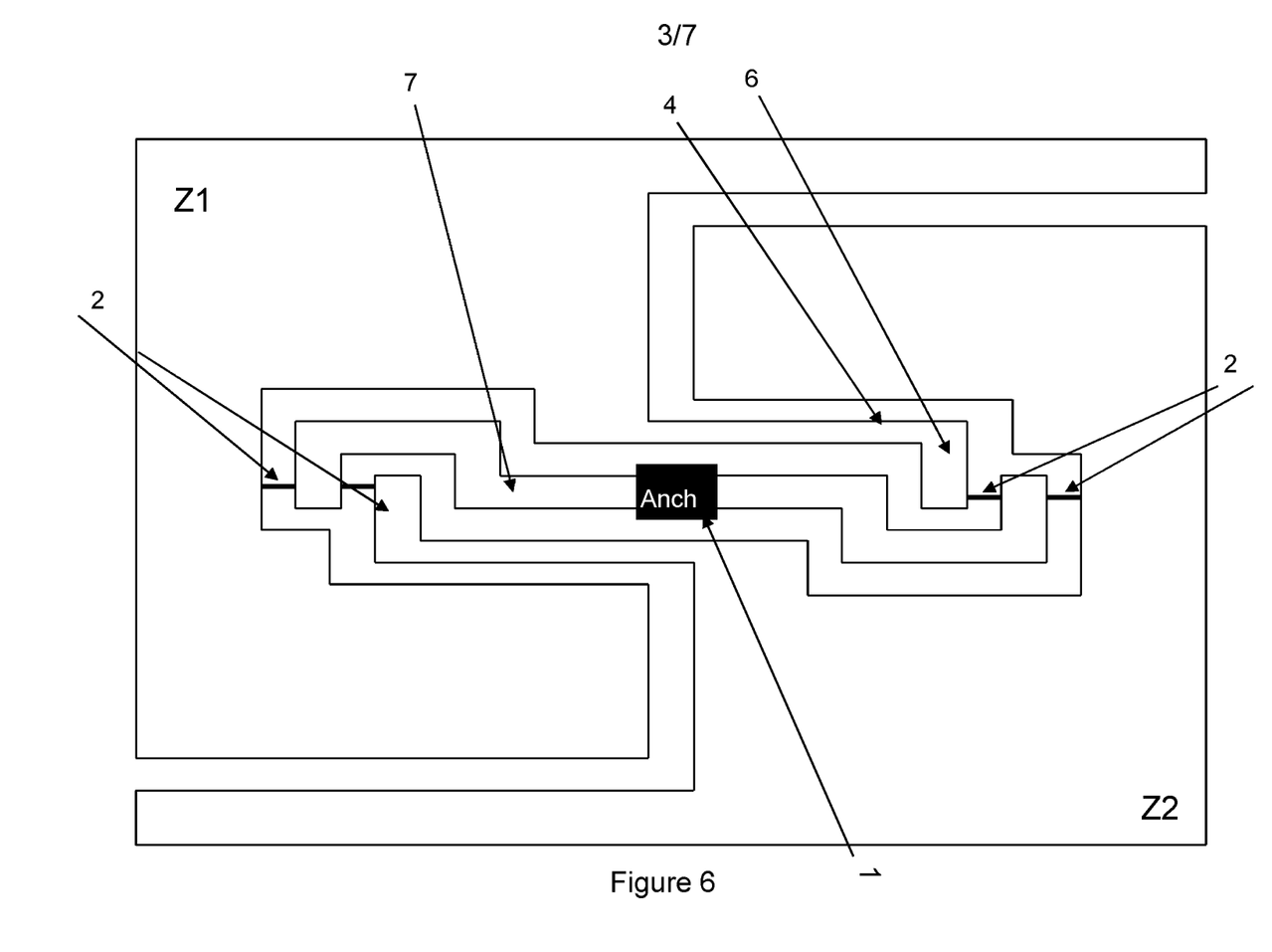
FIG. 6 illustrates a further advantageous embodiment of a sensor structure with an additional support structure.

FIG. 6 illustrates a further advantageous embodiment of a symmetric see-saw type of sensor structure, implemented with elements Z1 and Z2 for double differential detection, as described above. The elements Z1, Z2 are supported via a spring structure to a single anchor 1, and are arranged to pivot around a same axis of rotation aligned with springs 2. As shown in FIG. 6, each of the elements Z1 again comprises a side arm 4 and a shoulder means 6, with which the distance between the center of the seismic mass of elements and the ends of the springs 2 that support the elements is increased, and the structure is made more rigid in directions of unwanted vibrations. In order to further increase the distance, the springs 2 are supported to the anchor 1 with an elongate spring support 7 that extends outward of the anchoring point and provides a static point of suspension to the springs along the axis of rotation.

Figure 7:
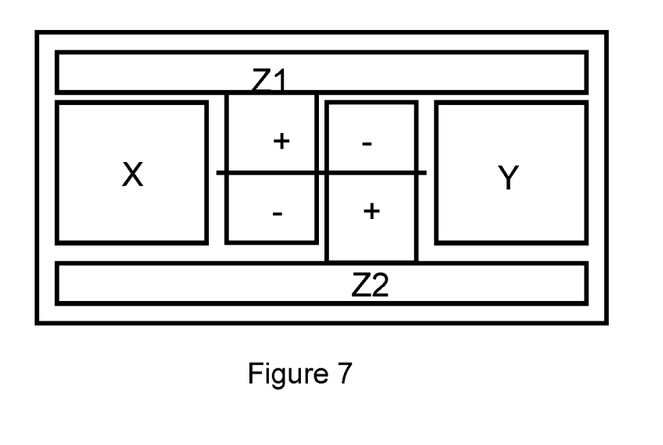
FIG. 7 illustrates an embodiment of a 3d acceleration sensor.

FIG. 7 illustrates an embodiment of a 3d acceleration sensor that may comprise any of the see-saw type of MEMS structures described above. The sensor may comprise also X- and/or Y-direction detection cells, which can be implemented in a way well known to a person skilled in the art of MEMS sensors. In FIG. 7, the two seismic masses Z1 and Z2 are also applicable for double differential detection with a configuration where the seismic masses are extended in the plane of the elements. Such configuration intensifies the movement and thereby improves sensitivity of the detection.

Figure 8:
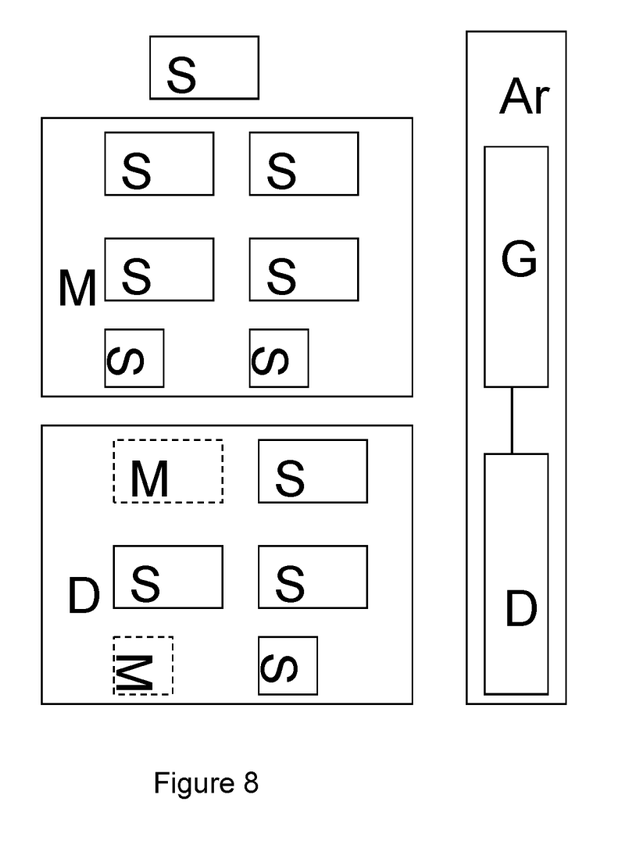
FIG. 8 illustrates embodiments of sensor matrix, a device, an arrangement, and a system according to the invention.

FIG. 8 illustrates different kind of embodiments that may comprise any of the see-saw type of MEMS structures described above. Letter S denotes a sensor or a sensor structure. Letter M denotes a sensor matrix that comprises a sensor or the sensor structure as embodied. Although four sensors of one type are shown in one position, and two sensors of another type in a different position, as an example, the number of sensors or their types (X, Y, Z or a combination thereof) are not limited only to the indicated example. Letter D denotes a device that comprises a sensor or a sensor matrix as embodied. Although exemplary four sensors are indicated, three sensors in one position and one sensor in another that is different than first said position, as an example, the number of sensors or their type is not limited only to the indicated example. The number and/or position of the sensor matrixes in the device are neither limited to the shown example only. The letter combination Ar denotes an arrangement or a system that comprises at least one of the embodied sensor structures in the device D, and/or a device G according to an embodiment of the invention. The exceptional position of the letters S and M in some embodiments illustrates to a skilled man in the art that the sensor structures in various embodiments can be operated independently on the true position of the master device, whose acceleration is monitored with the sensor structure comprising cells and/or flip-flops in the sensor S.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A MEMS structure, comprising an anchor, a spring, and a seismic mass that is suspended to the anchor via the spring to pivot around an axis of rotation, wherein
    the spring is included in a spring structure that extends from the seismic mass to the anchor;
    the spring structure includes also a side arm and a shoulder means;
    the side arm is connected to the seismic mass and extends from the seismic mass in a direction parallel to the axis of rotation of the seismic mass;
    the shoulder means is connected to one end of the side arm and to one end of the spring for attaching the side arm to the one end of the spring.

2. The MEMS structure of claim 1, wherein the shoulder means extends in a direction perpendicular to the direction of the axis of rotation.

3. The MEMS structure of claim 1, wherein the anchor is an elongated element that extends along the axis of rotation at least partly into the seismic mass.

4. The MEMS structure of claim 1, wherein the MEMS structure comprises two side arms in opposite sides of the seismic mass.

5. The MEMS structure of claim 4, wherein one of said side arms is different than the other side arm for different modes of stiffness against unwanted vibrations.

6. The MEMS structure of claim 4, wherein the MEMS structure comprises two of the shoulder means, and one of said shoulder means has a different length than another shoulder means for different modes of stiffness against unwanted vibrations.

7. The MEMS structure of claim 1, wherein the MEMS structure comprises two seismic masses used for double differential detection.

8. The MEMS structure of claim 7, wherein the two seismic masses are arranged to pivot around the same axis of rotation.

9. The MEMS structure of claim 7, wherein each of the two seismic masses comprises a side arm and a shoulder means, and the side arm and the shoulder means of one of the seismic masses are nested into dimensions of the other of the seismic masses.

10. The MEMS structure of claim 7, wherein the two seismic masses are supported a single anchor.

11. The MEMS structure of claim 7, wherein the two seismic masses are supported to the single anchor via an elongate spring support that extends outward of the single anchor.

12. A MEMS structure matrix including a MEMS structure according to claim 1.

13. An acceleration sensor including a MEMS structure according to claim 12.

14. A device comprising an accelerator sensor of claim 13, wherein said device comprises at least one of the following:
    a vehicle, cloth, shoe, pointer, compass, scales, seismometer, navigator, mobile device, mechanical motor, hydraulic motor, electric motor, generator, bearing module, centrifuge.

15. A system comprising a device of claim 14.

* * * * *